United States Patent [19]

Horikoshi et al.

[11] Patent Number: 5,393,631
[45] Date of Patent: Feb. 28, 1995

[54] TONER CARRIERS FOR ELECTROPHOTOGRAPHIC PRINTERS

[75] Inventors: Yuzo Horikoshi; Yasuo Yamagishi; Norio Sawatari, all of Kawasaki, Japan

[73] Assignee: Fujitsu Limited, Kawasaki, Japan

[21] Appl. No.: 75,725

[22] Filed: Jun. 14, 1993

[30] Foreign Application Priority Data

Jun. 25, 1992 [JP] Japan .................. 4-166624

[51] Int. Cl.$^6$ .............................. G03G 9/10
[52] U.S. Cl. ................... 430/108; 430/137
[58] Field of Search ............... 430/108, 137

[56] References Cited

U.S. PATENT DOCUMENTS 4,954,409  9/1990  Aoki et al. ................. 430/108
5,100,754  3/1992  Yoerger et al. ............. 430/108

*Primary Examiner*—John Goodrow
*Attorney, Agent, or Firm*—Staas & Halsey

[57] ABSTRACT

Electrophotographic printer toner carriers comprising a core material and a fluorinated polyimide resin coated on the core material, the fluorine content of the fluorinated polyimide resin being 5 to 60% by weight of the fluorinated polyimide resin.

5 Claims, No Drawings

TONER CARRIERS FOR ELECTROPHOTOGRAPHIC PRINTERS

BACKGROUND OF THE INVENTION

1. Field of the Invention

The present invention relates to electrophotographic printer toner carriers used for developing a latent image formed by electrophotography.

2. Descriptions of the Related Art

Electrophotography is known, for example, from U.S. Pat. No. 2,297,691. In such electrophotograpy systems, a photoconductive material such as is used in a photoconductive drum is uniformly charged with static electricity, by corona discharge or the like, and irradiated with a photo image to form an electrostatic latent image, which image is then developed with fine powders called toners to form an apparent image. The apparent image is optionally transferred onto printing paper, and fixed by pressing, heating, irradiation or chemical treatment.

The usual toners for developing an electrostatic latent image are particles of a natural or synthetic polymer binder with a colorant such as carbon black dispersed therein, having a particle size of 1 to 30 $\mu$m. Such toners are used alone or with carriers made of iron powders, glass beads or the like to develop an electrostatic latent image. When iron powders or other ferromagnetic particles are used as carriers, a developer comprising the toner and carrier is electrostatically charged, by friction during stirring, in a developing unit, forms a magnetic brush on a rotating magnetic roller, and is applied, by the rotating magnetic roller, onto the latent image on the photoconductive insulator. The electrostatically charged toners only are transferred to and held onto the latent image by electrostatic force and thus the development is completed. Supplemental toners are added to the developer with a reduced content of toner and mixed, by stirring, in the developing unit to form a developer with a constant composition.

The binder in the toners should be easily melted in the fixation step and exhibit a good adhesion to printing paper, etc. when cooled. To obtain such toner characteristics, low molecular weight polymers having a low melting point, called oligomers, are widely used as the binder. If the melting point of the binder in the toners is too low, however, the toner is soft so that toner filming on the surface of the carriers occurs due to the friction between the toners and carriers caused during stirring of the developer in the developing unit and, after long use of the developer, the carriers are completely covered with the toner. Such carriers, completely covered with toner, cannot develop an electrostatic charge by friction in stirring with toners and must be replaced with fresh carriers on developer.

Since frequent changes of the developer cause an increase in running costs and is not preferred, it is proposed to coat the carriers with a resin having a low surface energy such as silicon resin or fluorine-containing resin, e.g., polytetrafluoroethylene, so as to prevent the toners from adhering to the surface of the carriers and to prolong the useful life of the developer. If such a resin, having a low surface energy, is used as a coating resin on the carriers, however, the nonadherent property of the resin prevents the adherence of the toners onto the carriers to some extent, but the resin with a low adherent property cannot adhere firmly to the carrier core material and is peeled from the carrier core material by friction during stirring after long use. As a result, the electrical and electrostatic properties of the carriers vary and a good developing performance from the carriers cannot be maintained.

Among low surface energy resins, fluorine-containing resins such as polytetrafluoroethylene are often used as a coating resin for carriers capable of generating positive electrostatic charges on toners since those resins are easily positively charged. However, the fluorine-containing resins requires heating the resin to a temperature of 300 to 400° C. (about the melting point thereof) to fuse and adhere to the carriers after the resin is coated on the carriers, which necessitates much energy and increases the production cost. Moreover, the electrostatic charging characteristics of the fluorine-containing resin is very sensitive to a minor difference of said heating, which makes production stability difficult.

The object of the present invention is to provide electrophotographic printing carriers having a resin coating which prevents toners from adhering to the carriers and prevents loss of the resin coating by friction during stirring of the developer, so that the carriers keep adequate electrical and electrostatic charging properties and have a long useful life.

SUMMARY OF THE INVENTION

Typical carrier core materials are fine ferromagnetic particles such as iron or ferrite with a particle size of about 20 to 200 $\mu$m. When a fluorine-containing resin is used to coat the carriers, the following two methods are adopted.

(1) After a fluorine-containing resin is coated onto a core material, the coated material is heated to a temperature of 300 to 400° C. (about the melting point of the resin) to fuse the resin onto the core material.

(2) A core material is first coated with a primer such as acrylic resin or epoxy resin and the fluorine-containing resin is then coated on the primer.

The method (1) requires a coating step as well as a curing step to improve the adherence of the resin to the carrier core material. This curing step consumes much heat energy and increases the production cost. The electrostatic charging characteristics of the resin vary with the curing temperature, making the production stability difficult.

In the method (2), the curing temperature is normally up to 300° C. since the primer is thermally decomposed at a temperature of the melting point of the fluorine-containing resin. At such a curing temperature, the fluorine-containing resin is coated as powders on the primer and is peeled from the primer by friction during stirring in the developing unit. Thus, the electrical and electrostatic charging properties of the carriers cannot last for a long time.

After investigation, the inventors found electrophotographic printing carriers which prevent toners from adhering to the carriers and prevent abrasion of the resin coating by stirring of the developer, so that the carriers maintain adequate electrical and electrostatic charging properties for a long time, said carriers being produced by coating the carriers with a solvent-soluble fluorinated polyimide resin, which can be coated without a primer and can be cured at a temperature of not more than 200° C.

The fluorinated polyimide resin may be produced from monomers of fluorinated diamine and tetracarboxylic acid or anhydrous acid thereof and has a main repeating unit represented by the formula:

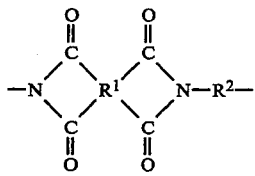

where R¹ stands for a tetravalent organic group and R² stands for a divalent fluorinated-organic group.

More specifically, R¹ may be an organic group represented by the formula:

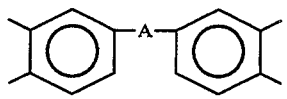

where A stands for an alkylene, —CO—, —O—, or a combination thereof, or a derivative thereof and R¹ may be fluorinated, and R² may be a fluorinated organic group represented by the formula:

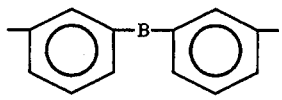

where B is an alkylene, —O— or —SO₂—, or a combination thereof such as -alkylene-O-, or a derivative thereof and R² is fluorinated.

Fluorinated polyimide resins may include resins as above in which the starting monomers are derivatives of the fluorinated diamine and tetracarboxylic acid or anhydrous acid thereof as described above.

The reasons why the above resin is preferred to coat carriers are shown below:

First, the above fluorinated polyimide resin is superior to normal fluorine-containing resins such as polytetrafluoroethylene in the solubility in an solvent. Namely, polar solvents such as N-methyl-2-pyrrolidone (NMP), dimethylacetoamide (DMAc), dimethyl sulphoxide (DMSO), dimethyl formamide (DMF) and sulphorane or such a polar solvent combined with a common solvent such as tetrahydrofuran, butylolactone, cyclohexanone, acetone, methylethylketone and diacetoalcohol, or common solvent alone, may be used as a solvent to form a solution of the fluorinated polyimide resin. Accordingly the coating composition of said resin can be a solution which can form a uniform coating. In contrast, normal fluorine-containing resins such as polytetrafluoroethylene cannot be dissolved in a solvent and it is therefore difficult to form a uniform coating.

Second, the above fluorinated polyimide resin has a higher adhesion to the carrier core material in comparison with normal fluorine-containing resins, for example, polytetrafluoroethylene. Polytetrafluoroethylene or the like requires a high curing temperature of, e.g., 300 to 400° C. to obtain a firm adhesion to the carrier core material. In contrast, the fluorinated polyimide resin sufficiently adheres to the carrier core material when only dried, at a temperature of about 200° C., to remove the solvent from the resin solution coated on the carrier core material. Thus, the production cost can be low.

Third, the above fluorinated polyimide resin does not require a primer such as acrylic resin or epoxy resin for forming a coating. Accordingly, even if the coated resin is abraded by extreme shocks in stirring the developer in the developing unit, the primer on the surface of the carrier is not exposed and the above polymer covers the surface of the carrier, so that the electrostatic charge property of the carrier is maintained for a long time.

The content of the fluorine atoms in the fluorinated polyimide resin should be 5 to 60% by weight, preferably 15 to 60% by weight based on the total weight of the fluorinated polyimide resin. Simply, this fluorine content can be calculated from the total molecular weight of the all fluorine atoms based on the total molecular weight of the repeating unit. If the fluorine content is less than 5% by weight, the coated resin layer does not have sufficient non-adherence property or property of providing electrostatical charges to tonners, and if the fluorine content is more than 60% by weight, it is difficult to form a fluorinated polyimide resin.

Also, the fluorinated polyimide resin should have a solubility parameter (SP value) of 9 to 12 to ensure a sufficient solubility in a solvent, since if the fluorine content of the resin increases, the adherence of the resin to a core material and the solubility of the resin in a solvent tend to be reduced.

The fluorinated polyimide resin may be produced by reacting fluorinated diamine and tetracarboxylic acid or anhydrous acid thereof and is commercially available.

The above fluorinated polyimide resin may be used alone or combined with other resins conventionally used in electrophotography, such as acrylic resin, epoxy resin, normal fluorine-containing resin, styrene, styrene-acrylic resin, etc. to form a coating on the carrier core material. When the fluorinated polyimide resin is combined with other resins, the content of the fluorinated polyimide resin should be not less than 20% by weight of the total resin weight.

The thickness of the resin coating on the carrier core material is generally 0.1 μm to 5 μm, preferably 0.5 μm to 2 μm.

The carrier core material may be any ferromagnetic particles that are conventionally used in the electrophotography, such as particles of iron, ferrite, magnetite, etc.

The carriers of the present invention can be produced using a conventional process. The fluorinated polyimide resin, optionally together with an electrostatic charge controlling agent, an electroconductivity controlling agent or other additives, is dissolved or dispersed in a solvent, which is then mixed with a carrier core material for carrying the coating, for example, in a rotary dry process.

EXAMPLE 1

A fluorinated polyimide resin having the following repeating unit:

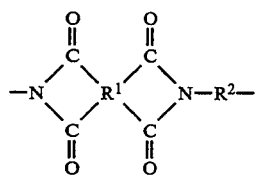

where R¹ is

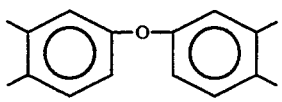

and

R² is

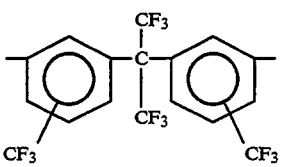

having a molecular weight of 9000, fluorine content of by weight and a solubility parameter of 12.1, was used. 15g of this resin was dissolved in 3 liters of methylethylketone to form a coating solution. The formed coating solution was poured onto 5 kg of spherical ferrite powder having an average particle size of 50 μm and a rotary dry coating process was performed to obtain coated carriers A.

EXAMPLE 2

The procedures of Example 1 were repeated to obtain coated carriers B, except that 15g of a fluorinated polyimide resin having the following repeating unit:

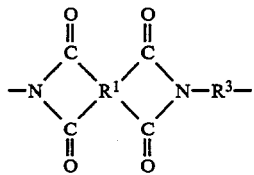

where $R^1$ is the same as in Example 1, and
$R^3$ is $R^2$ as in Example 1 or

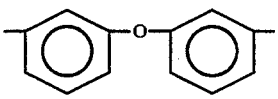

with a molar ratio of 2:1 in the resin, having a weight average molecular weight of 8000, fluorine content of 23% and a solubility parameter of 12.9, was dissolved in 100 milliliters of dimethyl acetoamide and methylethyl ketone was further added to a total volume 3 liters.

EXAMPLE 3

The procedures of Example 1 was repeated to obtain coated carriers C, except that 15g of a fluorinated polyimide resin having the following repeating unit:

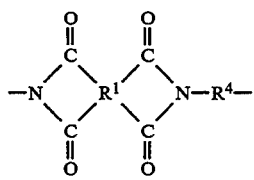

where $R^1$ is the same as in Example 1, and
$R^4$ is $R^2$ as in Example 1 or

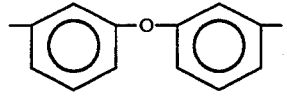

with a molar ratio of 1:2 in the resin, having a molecular weight of 11,000, fluorine content of 13% and a solubility parameter of 14.1, was dissolved in 500 milliliters of dimethyl acetoamide and methylethyl ketone was further added to make the total volume liters.

EXAMPLE 4

10g of the resin used in Example 1 and 5g of polytetrafluoroethylene powders with a particle size of 0.2 μm were used, and the procedures of Example 1 were repeated to perform the coating, to thereby obtain coated carriers D.

EXAMPLE 5

10g of the resin used in Example 1 and 5g of bisphenol-A epoxy resin were used, and the procedures of Example 1 were repeated to perform the coating, to thereby obtain coated carriers E.

Comparative Example 1

15g of a resin having the following repeating unit:

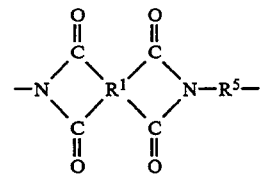

where $R^1$ is the same as in Example 1, and
$R^5$ is

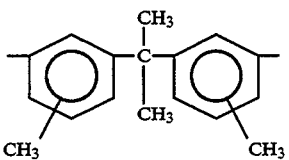

was dissolved in 1 liter of dimethylacetoamide and methylethyl ketone was further added to make the total volume 3 liters. Then the procedures of Example 1 were repeated to perform the coating and coated carriers F were obtained.

Comparative Example 2

15g of a resin having the following repeating unit:

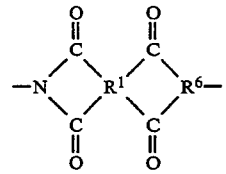

where $R^1$ is the same as in Example 1, and
$R^6$ is $R^2$ as in Example 1 or

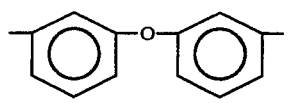

with a molar ratio of 1:9 in the resin, and having a molecular weight of 9000, fluorine content of 5% and a solubility parameter of 15.1, was dissolved in 3 liters of dimethyl acetoamide and the procedures of Example 1 were repeated to obtain coated carriers G.

Comparative Example 3

15g of polytetrafluoroethylene powders were dispersed in 3 liters of methylethyl ketone to form a coating composition. The formed coating composition was poured onto 5 kg of spherical ferrite powders with an average particle size of 50 μm and the rotary dry coating was performed.

The coated ferrite powders were then taken out and large particles larger than 120 μm were removed. The remaining coated ferrite powders were heated to 350° C. for 30 minutes to obtain coated carriers H.

The electrophotographic printing test was performed using coated carriers A to G.

A positively charging tonner was prepared by combining and pulverizing 90 parts by weight of polyester, 4 parts by weight of a dye, 5 parts by weight of carbon and 1 part by weight of wax to 5 to 15 μm in size. 95 parts by weight of this tonner was mixed with parts by weight of the respective coated carriers to prepare developers.

The electrostatic charge of each of the coated carriers was measured at the beginning of the printing test and after 5,000, 10,000 and 50,000 printing procedures. The printer used was a compact on-table type laser printer M3722, produced by Fujitsu Ltd. The results are shown in Table 1.

| Coated carriers | Electrostatic Charge (μc/g) | | | |
| --- | --- | --- | --- | --- |
| | Number of printing procedures | | | |
| | Beginning | 5,000 | 10,000 | 50,000 |
| A | 14 | 14 | 13 | 13 |
| B | 12 | 11 | 12 | 10 |
| C | 9 | 8 | 7 | 8 |
| D | 18 | 19 | 17 | 16 |
| E | 9 | 10 | 10 | 8 |
| F | 2 | 2 | 3 | 3 |
| G | 19 | 8 | 5 | 4 |

As can be seen in Table, the coated carriers A to E exhibit stable electrostatic charge characteristics for a long time and the quality of the printing was not reduced even after 5,000 printing procedures.

In contrast, when the coated carriers H were used, the electrostatic charge characteristic was reduced as the printing procedure was repeated and the background of the printed image became dirty after 5,000 to 10,000 printing procedures. When the coated carriers F and G were used, they were hardly electrostatically charged at all and the dirty background appeared from the beginning of the test.

We claim:

1. Electrophotographic printer toner carriers, said toner carriers being coated with a resin coating comprising a fluorinated polyimide resin containing fluorine atoms in an amount of 5 to 60% by weight based on the total weight of the fluorinated polyimide resin.

2. Toner carriers according to claim 1 wherein said fluorinated polyimide resin has a solubility parameter of 9 to 12.

3. Toner carriers according to claim 1 wherein said fluorinated polyimide resin has a main repeating unit represented by the formula:

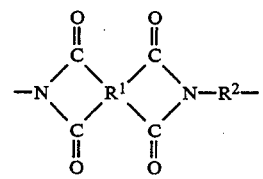

where $R^1$ stands for a tetravalent organic group and $R^2$ stands for a divalent organic group containing fluorine.

4. Toner carriers according to claim 3 wherein $R^1$ is represented by the formula:

where A stands for an alkylene, —CO—, —O—, or a combination thereof, or a derivative thereof, and $R^1$ may be fluorinated; and $R^2$ is represented by the formula:

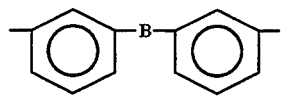

where B is an alkylene, —O— or —SO$_2$-, or a combination thereof, or a derivative thereof, and $R^2$ is fluorinated.

5. Toner carriers according to claim 1 wherein said fluorinated polyimide resin is contained in an amount of more than 20% by weight of the resin coating.

* * * * *

UNITED STATES PATENT AND TRADEMARK OFFICE
CERTIFICATE OF CORRECTION

PATENT NO. : 5,393,631
DATED : February 28, 1995
INVENTOR(S) : YUZO HORIKOSHI et al.

It is certified that error appears in the above-indentified patent and that said Letters Patent is hereby corrected as shown below:

Column 5, line 20, before "by" insert --30%--.
 Column 7, line 27, delete "tonner" and substitute --toner--.
 Column 7, line 30, delete "tonner" and substitute --toner--.
Column 7, line 30 between "with" and "parts" insert --5--.

Signed and Sealed this

Thirtieth Day of May, 1995

Attest:

BRUCE LEHMAN

Attesting Officer
Commissioner of Patents and Trademarks